United States Patent [19]

Kucherry

[11] 4,055,365
[45] Oct. 25, 1977

[54] CHOKER ASSEMBLY

[76] Inventor: James David Kucherry, Rte. 1, Bonners Ferry, Idaho 83805

[21] Appl. No.: 669,096

[22] Filed: Mar. 22, 1976

[51] Int. Cl.² .................. B66C 1/34; F16G 11/04
[52] U.S. Cl. .................. 294/78 R; 24/115 R; 24/122.6; 403/209
[58] Field of Search .......... 294/74, 78; 24/115 R, 24/230.5 LA, 230.5 CS, 230.5 TA; 403/209, 248, 251, 216

[56] References Cited

U.S. PATENT DOCUMENTS

| 790,929 | 5/1905 | Smith | 294/74 |
|---|---|---|---|
| 2,359,307 | 10/1944 | Evans | 294/74 |
| 2,637,591 | 5/1953 | Maxfield | 294/74 |
| 3,175,264 | 3/1965 | Maras | 294/78 R |
| 3,239,900 | 3/1966 | Bottoms | 294/74 |
| 3,475,795 | 11/1969 | Youngblood | 24/122.6 |
| 3,844,601 | 10/1974 | Rochester | 294/74 |

FOREIGN PATENT DOCUMENTS

| 660,357 | 2/1964 | Italy | 24/136 L |
|---|---|---|---|
| 512,893 | 9/1939 | United Kingdom | 24/122.6 |

Primary Examiner—Bernard A. Gelak
Attorney, Agent, or Firm—Wells, St. John & Roberts

[57] ABSTRACT

A choker assembly for logging winchlines. The assembly includes a choker rope with a ferrule at one end. A choker hook is slidably mounted to the rope for releasably receiving the choker rope ferrule. The remaining end of the choker rope is releasably attached to a winchline slider. The slider includes an integral enlarged winchline opening and an angular offset choker rope opening. The choker rope opening is tapered, with a reduced outer end and an enlarged inner end for receiving the free choker rope end. A conical sleeve is releasably mounted to the free end of the choker rope so as to expand the rope end to a cross-sectional diameter greater than the diameter of the choker rope opening. Thus the choker rope end is held against outward movement through the choker rope opening. The rope may be selectively removed simply by removing the conical sleeve from the choker rope end. This allows the rope to return to its original diameter and be pulled through the choker rope opening.

4 Claims, 5 Drawing Figures

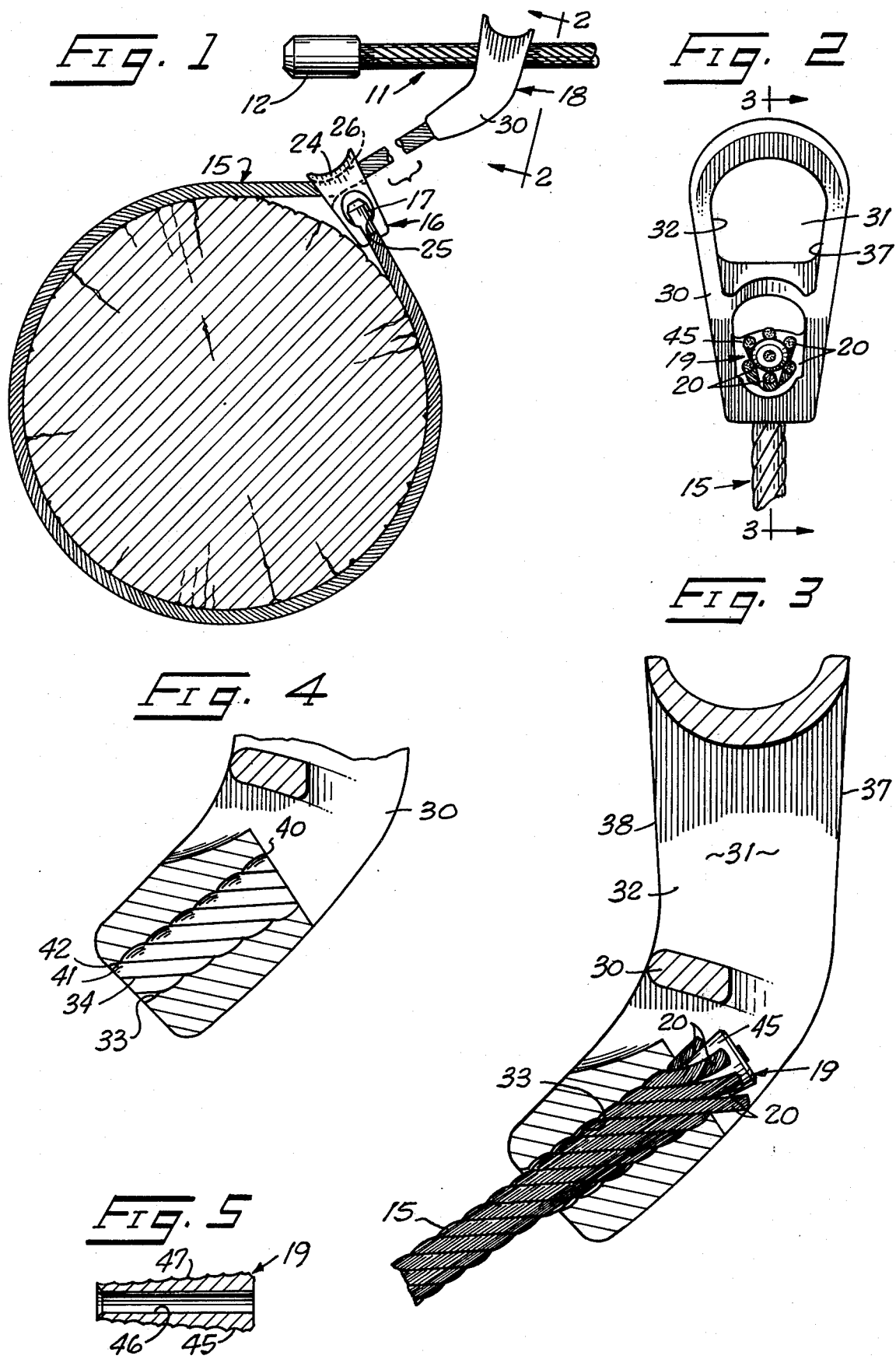

CHOKER ASSEMBLY

BACKGROUND OF THE INVENTION

The present invention is related to log retrieval equipment and more particularly to such equipment utilizing a winehline or dragline that is extended out from a landing or towing vehicle to the vicinity of cut logs where "chokers" are set about the individual cut logs and dragged back to the landing area.

A choker assembly ordinarily includes a length of wire rope that is operatively connected to a towing apparatus or winch. One end of the choker includes a hook or other mechanism by which a loop may be formed in the rope about the circumference of a cut log. Usually a quick disconnect type "choker hook" is utilized to improve speed in setting the choker about a log.

Once the choker is "set" the assembly and attached log may be pulled to a landing area where the choker is released and the log is loaded onto a truck. Often, several choker assemblies are utilized on a single towing line or winchline. When this is the case, a winchline is utilized that has a large ball or "ferrule" fixed to its free end. The individual choker assemblies are slidably mounted to the winchline by "sliders". Ordinarily, each choker rope is permanently affixed to a slider or may be provided with a choker ferrule that will removably fit within a complementary opening in the sliding link. It is well known that breaking of the choker line will most frequently occur at or near the slider. Both types of sliders present problems when the choker rope breaks due to wear or excessive force applied.

It is desirable to obtain some form of choker assembly which, if the choker rope wears or breaks, may be replaced or refitted to the slider in the field location. Previous choker assemblies require that the ferrule be replaced by a swaging machine, or that new "babbitt" or other filler material be repoured to anchor the choker end to the slider. Either of these methods require considerable time. Especially, the ferrule type connections must be produced at a service shop where there is a large swage press required to perform this function. There has also been some difficulty with the babbitt type connections since they have not proven to be sufficiently strong to hold under excessive loads. The broken cable and babbitt material must be removed from the slider before a new choker end can be placed in the appropriate slider aperture. The entire slider member must then be heated to a temperature sufficient to melt the babbitt material and allow it to run from the choker rope receiving opening. In doing so, the slider material and rope strands may become annealed or otherwise weakened at critical stress points.

U.S. Pat. No. 1,649,654 describes a tow line wherein a hook is affixed to a wire rope by an expanded rope end that is probably impregnated with a babbitt material such as zinc.

U.S. Pat. No. 917,738 discloses a choker line for log hauling cables. This assembly uses a looped end of a choker line to receive or be connected to a hauling cable with the remaining end mounting a ferrule. It is disclosed that the ferrule is connected to the cable by babbitt material "as usually done".

U.S. Pat. No. 2,793,066 discloses a choker link wherein a choker rope is permanently connected by securing an end of the rope within a receiving aperture of the link, fraying the ends of the interwoven strands, and then pouring the opening full of a "high grade babbitt after the manner in which such connections are habitually made at the ends of cables".

U.S. Pat. No. 1,549,093 discloses a choker hook for logging operations wherein a ferrule is connected permanently to the free end of a choker line. The choker line, however, is first threaded through an appropriate aperture in the choker hook. Then the rope end is inserted through the ferrule and is attached by fraying the rope end and pouring the ferrule full of a molten babbitt material. Once the babbitt material hardens, it securely holds the ferrule at the choker end. The ferrule will not permit movement of the choker end through the small sized hook opening.

U.S. Pat. No. 1,651,081 discloses a choker hook that has a removable choker line. Again, the choker line includes at its free end a ferrule that is either connected by babbitt material or is swaged onto the cable end to provide a permanent connection thereto. The advantage of this arrangement is that the choker line may be removably attached to the winchline slide. Thus any selected number of choker assemblies may be easily maintained on the winchline.

Other examples of choker assemblies and choker hooks may be found in U.S. Pat. Nos. 1,959,985; 1,446,781; 2,518,276; 1,764,175; 2,215,023; 2,828,156; 1,464,162; and Canadian Pat. No. 483,585.

Of the above cited patents, none disclose a choker assembly without a ferrule rope end by which the choker rope may be selectively removed from the winchline slider. Although these existing assemblies may be serviceable, it is desirable to obtain some form of choker assembly that, if the choker rope becomes damaged, may be easily repaired in the field without the use of babbitt material or a swage press.

It is a first object of the present invention to provide a choker assembly which will enable quick and efficient field repair of a choker rope connection on a winchline slider.

It is a further object to provide such a choker assembly wherein there are no more operational parts or elements involved than those being presently utilized with existing assemblies.

A still further object is to provide such a choker assembly that does not require the use of special tools to effect field repairs on the winchline slider connection.

These and still further objects and advantages will become apparent upon reading the following description which, taken with the accompanying drawings, disclose a preferred form thereof. It should be noted however, that the following description is not intended in any way to limit the scope of this invention and that only the claims attached at the end of the specification are to be taken as such restrictions and as definitions of the present invention.

BRIEF DESCRIPTION OF THE DRAWINGS

A preferred form of the present invention is illustrated in the accompanying drawings in which;

FIG. 1 is a fragmentary view of the present invention shown in place on a winchline and engaged about the circumference of a log;

FIG. 2 is a view taken substantially along line 2—2 in FIG. 1 and showing a forward end of the slider element with the winchline removed therefrom;

FIG. 3 is an enlarged sectional view taken along line 3—3 in FIG. 2;

FIG. 4 is a fragmentary view of the assembly shown in FIG. 3 with the choker rope removed therefrom; and FIG. 5 is a sectional detailed view of a wedge means utilized to connect the choker rope to the slider member.

DETAILED DESCRIPTION OF A PREFERRED EMBODIMENT

The present assembly is shown in an operative condition by FIG. 1 of the drawings. As shown, the assembly is slidably mounted to a winchline 11 having a ferrule 12 affixed to one end thereof. The present assembly basically includes an elongated choker rope 15 that slidably receives a choker hook 16. An end of the choker rope 15 includes a choker ferrule 17 that is releasably received by the choker hook 16. The remaining end of choker rope 15 is releasably attached to a slider means 18 that mounts the assembly to winchline 11 for sliding movement thereon. Chodker rope 15 is releasably mounted to slider 18 by a wedge means 19 (FIGS. 2, 3, and 5).

the choker rope 15 is formed of interwoven wire strands 20 having a central core strand 21. Conventional right or left-lay, regular lay wire rope is found to be best suited for this purpose.

The choker hook 16 is illustrated in FIG. 1 of the drawings. It is comprised of a hook body 24 that is formed of a single integral element having a ferrule receiving socket 25 at one end and a choker rope receiving opening 26 at an opposite end. The choker rope receiving opening slidably receives the choker rope in order to mount the choker hook for sliding movement along the full length of the choker rope 15 between the choker ferrule 17 and the slider 18.

The ferrule 17 is of conventional form and may be swaged or fitted with babbitt material to the end of choker rope 15. It is designed to be releasably received within the ferrule receiving socket 25. Specific arrangement of the socket structure may be found in U. S. Pat. Nos. 1,764,135 and 1,651,081, or 2,828,156.

An important feature of the present invention is the particular design of the slider means 18. It is shown in substantial detail by FIGS. 2-4. The slider means 18 is comprised of an integral body portion 30 that is elongated and bent angularly so that the angulated portions thereof form an obtuse angle. One leg of this angle includes a winchline opening 31. Opening 31 extends completely through the slider body and is defined by continuous walls 32. The other angular leg portion of body 30 includes a choker rope opening 33. Opening 33 extends completely through the slider body and is defined by continuous walls 34.

The winchline opening 31 includes a forward side opening 37 and a rear side opening 38. The slider body fits on the winchline with the rear side opening 38 facing the winchline ferrule 12 as shown in FIG. 1. Opening 31 is not of sufficient diameter to allow passage of ferrule 12 therethrough. Therefore, when the winchline is drawn toward the towing or hauling apparatus, the slider body 30 will slide freely on the winchline until the ferrule 12 is contacted. At that point, the complete choker assembly is forced to move along with the winchline.

The choker rope opening 33 is tapered along its longitudinal axis from an enlarged end 40 to an outward reduced end 41. Walls 34 are distinguished by spiral grooves 42 that are complementary to the lay of the choker rope 15. The reduced end 41 is of sufficient diameter to allow free passage of the free choker rope end therethrough. Wedge means 19 it utilized to expand the effective diameter of the wire rope so that it may not escape rearwardly through opening 33.

The wedge means 19 is simply comprised of a conical sleeve 45 having a longitudinal central bore 46. The bore 46 is designed to receive the central strand of choker rope 15 while the conical surface 47 of the sleeve is utilized to spread the remaining strands radially apart, thereby increasing the effective rope diameter. The sleeve 45 may be driven onto the center rope strand by any appropriate impact tool such as a hammer. Therefore, the slider and choker rope may be easily assembled in the field. Further, the sleeve may be removed from the rope end simply by pulling the sleeve loose from the rope end to allow the rope strands to move together while passing through the opening 33. Therefore, the choker rope and hook may be easily disconnected from the slider in the field.

It is conceivable that the surface configuration of wedge means 19 and walls 34 be reversed without affecting the cable gripping efficiency of the assembly. In doing so, the conical surface 47 would include spiral grooves 48 (FIG. 5), and the walls of opening 33 would be smooth. The grooves 48 would be complementary to the "lay"of the wire rope and would function similarly to grooves 42.

If the choker rope should break or become damaged and replacement is required, the end remaining within the opening 33 may easily be driven out by a punch or other appropriate tool to clear the opening for the reception of a new rope end.

The particular angular design of the relative openings 31 and 33 is such that the choker rope 15 may be affixed to the slider while the slider is mounted to a winchline 11. The wedge means 19 may be placed over the rope end and driven onto the rope without interference by the winchline 11. Further, this rearward inclined angle facilitates a more direct line towing capability that is transferred from the winchline 11 to the choker rope 15.

In operation, the choker assemblies are first mounted to the winchline 11 by threading a winchline end through the winchline opening(s) 31. It is desirable to mount a maximum number of the slider members to the winchline, thereby avoiding the necessity of rethreading the winchline onto a winch drum should additional choker assemblies be required at a future date.

Once the sliders are slidably engaged on the winchline, choker ropes may be attached or removed at will. However, in actual practice, the sliders will remain permanently in place on the winchline so long as the winch ferrule 12 is functional. Each choker rope is attached simply by threading a free rope end through an opening 33 and then placing a wedge means 19 on the rope end. The wedge will effectively lock the choker rope to the slider. To remove a choker rope, one must simply pull the wedge means from the rope end to allow radial constriction of the rope strands.

To operate the present choker assembly, a "choker setter"drags the choker rope 15 by the choker ferrule 17 and choker hook 16 to a location where a tree has fallen. He then wraps the choker rope about the circumference of the tree trunk, fits the choker ferrule 17 into its complementary ferrule receiving socket 25 and secures it in position. He then signals a winch or towing vehicle operator to draw the winchline 11 toward a selected landing area. The slider will move freely along the length of winchline 11 until the ferrule 12 engages the slider. From that point on, the choker assembly is forced to move along with the winchline and will thereby pull the cut log in the same direction.

If several choker assemblies are utilized on a single winchline, each separate slider member will move independently along the winchline until the ferrule comes into contact with the first slider. The slider will then move with the winchline until it contacts the second slider and so on. Finally, the entire group of choker assemblies is gathered at the rearward end of the winchline and will move together with the winchline and logs gripped thereby toward a landing area.

Should a choker rope 15 break, such as at the broken area shown in FIG. 1, all that is required to replace or repair the break is to remove the broken portion from the opening 33, reinsert the free choker rope end through opening 33, and replace the wedge means onto the new rope end. This again secures the choker rope to the slider member.

It is again emphasized that no exotic tools are required to perform this operation. Nor are any particular tools required to remove the choker rope from a selected slider body. A simple pair of pliers or another tool of that nature may be utilized to pull the conical sleeve from engagement with the choker rope end. By doing this, the rope strands are then freed to move radially together so the rope may be easily pulled through the opening 33.

It may have become obvious upon reading the above description and upon examination of the accompanying drawings that various changes and modifications may be made therein. As previously noted, it is not the intent of this description nor the attached drawings to place particular restrictions upon the scope of this invention. Only the following claims are intended to place restrictions upon my invention.

What I claim is:

1. A choker assembly slidably mountable to a ferrule ended logging winchline, comprising:
    a choker rope formed of a length of interwoven wire rope having a central core strand surrounded by a plurality of outer interwoven twisted strands;
    a choker ferrule fixed at one end of the rope;
    a choker hook slidably mounted on the choker rope and adapted to releasably receive the choker ferrule;
    slider means for releasably mounting the remaining end of the choker rope to the winchline;
    wherein the slider means includes an elongated longitudinally curved slider body having an enlarged winchline receiving opening formed transversely through one end and a choker rope receiving opening formed longitudinally through the other end of the slider means and in open communication with the winchline receiving opening for receiving the remaining choker rope end therethrough;
    wherein the choker rope receiving opening tapers from an enlarged open end opening into the winchline receiving opening to a reduced open end at the terminus of the slider body;
    wherein the choker rope receiving opening includes spiral grooves complementary to the outer twisted strands of the choker rope; and
    a wedge means separate from the slider body which includes a conical sleeve of sufficient size to be mountable into the tapered choker rope receiving opening by access through the enlarged winchline receiving opening in which the conical sleeve has a longitudinal base for slipping over the central core strand and a conical exterior surface for spreading the outer interwoven strands radially outward into the spiral grooves to releasably grip the outer strands in the choker rope receiving opening and thereby prevent the remaining end of the choker rope from being drawn through the choker rope receiving opening.

2. The choker assembly as defined by claim 1 wherein the slider body is curved to form an obtuse angle with one leg thereof including the winchline opening and the other leg including the choker rope opening, with the axis of the choker rope opening being substantially parallel to the other leg.

3. The choker assembly as defined by claim 1 wherein the respective openings are defined by solid continuous walls of the slider body.

4. The choker assembly as defined by claim 1 wherein the conical exterior surface includes spiral grooves complementary to the outer twisted strands for receiving the outer twisted strands therein in conjunction with the spiral grooves of the choker rope receiving opening to firmly releasably grip the outer twisted strands to the slider means.

* * * * *